United States Patent
Doller

(10) Patent No.: US 10,107,676 B2
(45) Date of Patent: Oct. 23, 2018

(54) ADAPTIVE ACOUSTIC INTENSITY ANALYZER

(71) Applicant: Robert Bosch GmbH, Stuttgart (DE)

(72) Inventor: Andrew Doller, Sharpsburg, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/121,626

(22) PCT Filed: Mar. 18, 2015

(86) PCT No.: PCT/US2015/021290
§ 371 (c)(1),
(2) Date: Aug. 25, 2016

(87) PCT Pub. No.: WO2015/143055
PCT Pub. Date: Sep. 24, 2015

(65) Prior Publication Data
US 2016/0363477 A1    Dec. 15, 2016

Related U.S. Application Data

(60) Provisional application No. 62/060,364, filed on Oct. 6, 2014, provisional application No. 61/955,151, filed on Mar. 18, 2014.

(51) Int. Cl.
G01H 3/12    (2006.01)
(52) U.S. Cl.
CPC ............... *G01H 3/12* (2013.01); *G01H 3/125* (2013.01)
(58) Field of Classification Search
CPC .................................. G01H 3/125; G01H 3/12
(Continued)

(56) References Cited

U.S. PATENT DOCUMENTS 3,697,936 A * 10/1972 Zacharias, Jr. ...... G01N 29/024
367/95
3,961,291 A * 6/1976 Whitehouse ........... G01H 3/125
333/156
(Continued)

FOREIGN PATENT DOCUMENTS

WO    2006/121896    11/2006
WO    2010/003836    1/2010

OTHER PUBLICATIONS

Huang et al., "Shake and Walk: Acoustic Direction Finding and Fine-grained Indoor Localization Using Smartphones," IEEE, 2014 (9 pages).
(Continued)

*Primary Examiner* — J M Saint Surin
(74) *Attorney, Agent, or Firm* — Michael Best & Friedrich LLP

(57) ABSTRACT

Systems and method for providing an audio output with an acoustic intensity analyzer. The acoustic intensity analyzer includes an acoustic intensity array, a controller, and an orientation sensor. The acoustic intensity array is fixed to the acoustic intensity analyzer. The controller is coupled to the acoustic intensity array to produce the audio output using acoustic holography based on an input from the acoustic intensity array. The controller is configured to set an aim of the acoustic holography in a selected direction. The orientation sensor is coupled to the controller and mechanically fixed to the acoustic intensity analyzer such that there is no relative movement between the orientation sensor and the acoustic intensity array. The orientation sensor detects a change in an orientation of the acoustic intensity array and provides an orientation signal to the controller for adjusting the aim of the acoustic holography to maintain the selected direction.

20 Claims, 5 Drawing Sheets

(58) Field of Classification Search
USPC .......................................................... 73/646
See application file for complete search history.

(56) References Cited

U.S. PATENT DOCUMENTS

| | | | |
|---|---|---|---|
| 4,001,763 A | | 1/1977 | Kits van Heyningen |
| 4,429,702 A * | | 2/1984 | von Recklinghausen ................... A61B 1/2275 |
| | | | 600/559 |
| 4,620,445 A * | | 11/1986 | McKendree ............. G01H 3/14 |
| | | | 73/647 |
| 8,150,063 B2 | | 4/2012 | Chen et al. |
| 8,155,345 B2 | | 4/2012 | Tagawa et al. |
| 8,199,931 B1 * | | 6/2012 | Norris ..................... H04R 17/00 |
| | | | 181/142 |
| 8,467,542 B2 | | 6/2013 | Sato |
| 8,583,392 B2 | | 11/2013 | Panagas |
| 9,319,785 B2 * | | 4/2016 | Lee ......................... G01S 3/808 |
| 2006/0079291 A1 | | 4/2006 | Granovetter et al. |
| 2006/0098534 A1 * | | 5/2006 | Hickling ............... G01S 3/8006 |
| | | | 367/124 |
| 2008/0034869 A1 | | 2/2008 | Heinz et al. |
| 2008/0056457 A1 | | 3/2008 | Hsu |
| 2011/0120222 A1 | | 5/2011 | Scholte et al. |
| 2011/0158425 A1 | | 6/2011 | Hayakawa |
| 2011/0221671 A1 | | 9/2011 | King, III et al. |
| 2012/0155703 A1 | | 6/2012 | Hernandez-Abrego et al. |
| 2012/0259628 A1 | | 10/2012 | Siotis |
| 2012/0288126 A1 | | 11/2012 | Karkkainen et al. |
| 2013/0034241 A1 | | 2/2013 | Pandey et al. |
| 2013/0147835 A1 * | | 6/2013 | Lee ........................ H04R 3/005 |
| | | | 345/629 |
| 2016/0245905 A1 * | | 8/2016 | Watanabe ............ A61B 8/4483 |

OTHER PUBLICATIONS

Pertila et al., "Time of Arrival Estimation for Blind Beamforming," Tampere University of Technology, 2013 (6 pages).
International Search Report and Written Opinion for Application No. PCT/US2015/021290 dated Aug. 11, 2015 (10 pages).
English translation of the Notice of Final Rejection from the Korean Patent Office for Application No. 10-2016-7025572 dated Mar. 29, 2018 (2 pages).

* cited by examiner

ADAPTIVE ACOUSTIC INTENSITY ANALYZER

RELATED APPLICATIONS

This application claims priority to U.S. Provisional Application No. 61/955,151, filed on Mar. 18, 2014 and titled "DIRECTIONAL MICROPHONE SYSTEM WITH INTERGRAL INERTIAL REFERENCE," the entire contents of which is incorporated by reference. This application also claims priority to U.S. Provisional Application No. 62/060,364, filed on Oct. 6, 2014 and titled "MICROPHONE SYSTEM WITH INTEGRAL INERTIAL REFERENCE," the entire contents of which is incorporated by reference.

BACKGROUND

Embodiments of the invention relate to an acoustic intensity analyzer with acoustic intensity arrays and an integral inertial reference device for determining the self-orientation of the acoustic intensity analyzer.

Acoustic intensity arrays can provide spatial tracking of acoustic sources. However, their location and orientation must be predetermined and fixed. Acoustic intensity arrays can provide vector sampling of an acoustic environment relative to the axis of its assembly. However, the physical orientation of the array axis to the acoustic environment is critical for the accuracy of the vector sampling. If the acoustic intensity array is jostled and the orientation of the array axis is offset from its intended direction, the acoustic vector sampling is of little, if any, use.

SUMMARY

The fixed-orientation requirement of acoustic intensity array can be relaxed if the acoustic intensity array is able to continuously determine its orientation relative to an inertial reference frame. An integral inertial tracking system in the acoustic intensity analyzer can provide the necessary tracking to follow any positional changes in the acoustic intensity array.

Thus, in one embodiment, the invention provides an acoustic intensity analyzer to produce an audio output. The acoustic intensity analyzer includes an acoustic intensity array, a controller, and an orientation sensor. The acoustic intensity array is fixed to the acoustic intensity analyzer. The controller is coupled to the acoustic intensity array to produce the audio output using acoustic holography based on an input from the acoustic intensity array. The controller is configured to set an aim of the acoustic holography in a selected direction. The orientation sensor is coupled to the controller and mechanically fixed to the acoustic intensity analyzer such that there is no relative movement between the orientation sensor and the acoustic intensity array. The orientation sensor detects a change in an orientation of the acoustic intensity array and provides an orientation signal to the controller for adjusting the aim of the acoustic holography to maintain the selected direction.

In another embodiment, the invention provides method of producing an audio output using an acoustic intensity analyzer. The method includes capturing an input with an acoustic intensity array fixed to the acoustic intensity analyzer. The method further includes producing the audio output using acoustic holography based on the input with a controller coupled to the acoustic intensity array. The method also includes setting an aim of the acoustic holography in a selected direction with the controller. The method further includes detecting a change in an orientation of the acoustic intensity analyzer with an orientation sensor that is mechanically fixed to the acoustic intensity analyzer such that there is no relative movement between the orientation sensor and the acoustic intensity array. The method also includes determining an orientation signal with the orientation sensor. The orientation signal is based on the change in the orientation of the acoustic intensity analyzer. The method further includes adjusting the aim of the acoustic holography to maintain the selected direction based on the orientation signal with the controller.

Other aspects of the invention will become apparent by consideration of the detailed description and accompanying drawings.

DETAILED DESCRIPTION

Figure 1:
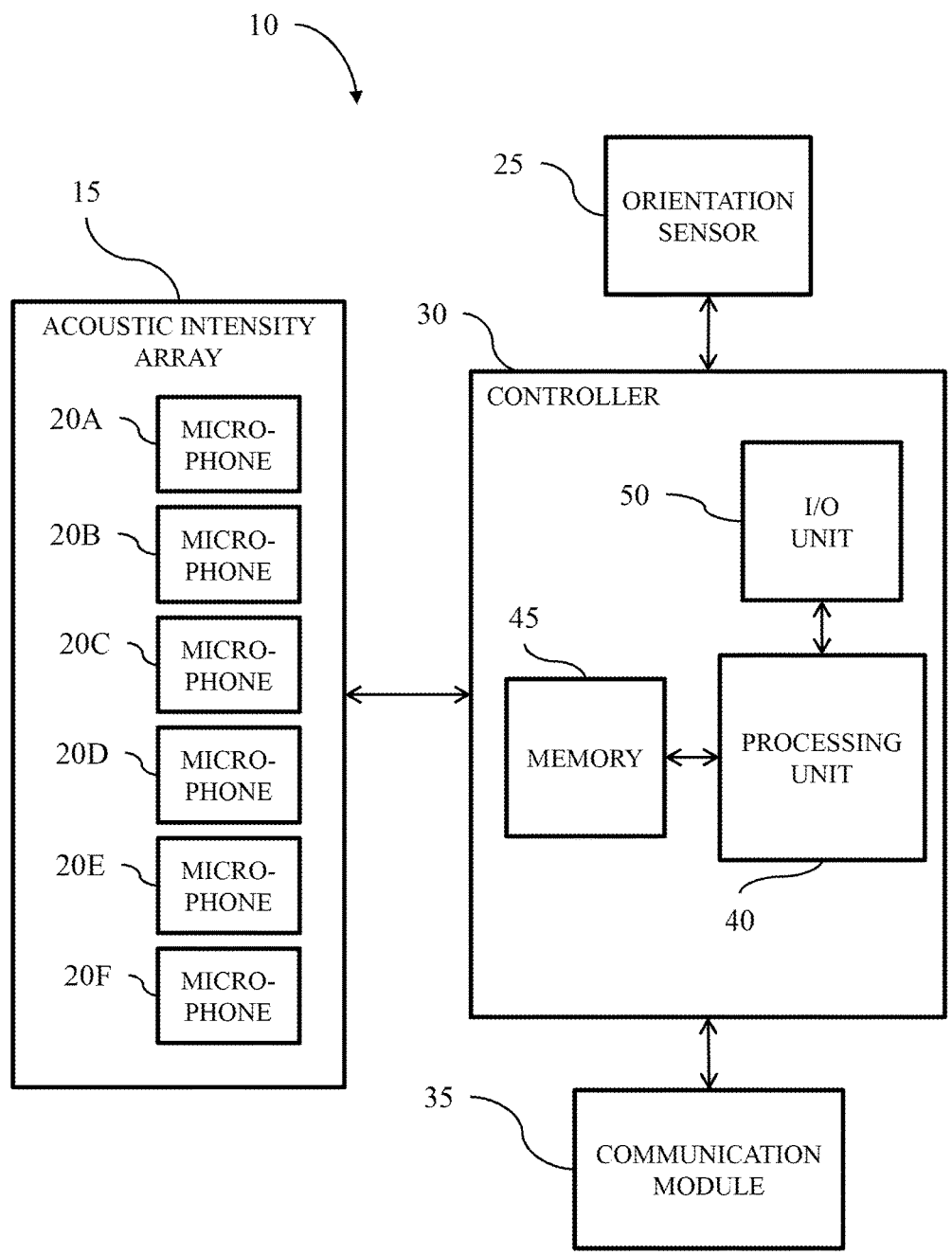
FIG. 1 is a block diagram of an acoustic intensity analyzer, according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should also be noted that a plurality of different structural components may be utilized to implement the invention. Furthermore, and as described in subsequent paragraphs, the specific configurations illustrated in the drawings are intended to exemplify embodiments of the invention. Alternative configurations are possible.

Acoustic holography is a method that is used to estimate a sound field near a source by measuring acoustic parameters away from the source via an array of microphones. In other words, acoustic holography is a method of mapping acoustic fields in an environment. The acoustic intensity arrays determine a plurality of vector quantities for every wave emitting source in range of the arrays. Waves include, for example, audio waves and ultrasonic waves. Each vector quantity includes both a velocity component and a pressure component for an acoustic field. A vector quantity represents an intensity (also referred to as power) measurement of an acoustic field. An intensity value includes one or more vector quantities for an acoustic field.

Acoustic holography is used by acoustic intensity analysis systems in mobile devices, such as cell phones, to capture sound from a user and produce an audio output. Another method of recording a target acoustic field is beamforming. Beamforming is very different than acoustic holography. Beamforming improves the quality of recording a target acoustic field by changing the beam characteristics (i.e., localizing on a desired source while actively filtering out other acoustic fields). In other words, beamforming improves the capturing of an acoustic signal from a selected location by removing acoustic signals from other locations. Stated more simply, beamforming removes unwanted audio signals to provide better recording of wanted audio signals.

Unlike beamforming, acoustic holography does not remove any information. Acoustic holography provides a complete acoustic vector field for every acoustic source in an environment. In essence, acoustic holography provides a complete picture of every audio signal in an environment. This complete picture enables an acoustic intensity analysis system to produce an audio output based on a single acoustic source in the environment. In order to provide this complete picture, acoustic holography requires a known reference position of the acoustic intensity array. In other words, acoustic holography requires that the relative positions between each of the microphones in the acoustic intensity array and the relative position between the acoustic intensity array and a reference position be known. Further, acoustic holography requires that these relative positions remain constant. Any motion of the acoustic intensity array introduces a positioning error into the measured vector quantities.

FIG. 1 illustrates a block diagram of an acoustic intensity analyzer 10, according to some embodiments of the invention. The acoustic intensity analyzer 10 includes, among other components, an acoustic intensity array 15 having a plurality of microphones 20A-20F, an orientation sensor 25, a controller 30, and a communication module 35. The orientation sensor 25 enables the acoustic intensity analyzer 10 to detect changes in the position of the acoustic intensity array 15 relative to a reference position (not shown) and allows the controller 30 to adapt the vector quantities for uninterrupted capture of acoustic fields.

In some embodiments, the microphones 20A-20F are intensity probes and/or particle velocity transducers. In some embodiments, the microphones 20A-20F are pressure gradient microphones. Pressure gradient microphones measure the velocity component of an acoustic field. In some embodiments, the microphones 20A-20F are intensity probes that include velocity gradient sensors. Velocity gradient sensors measure the pressure component of an acoustic field.

In some embodiments, the orientation sensor 25 is a compass that is mechanically fixed to the acoustic intensity analyzer 10 such that there is no relative movement between the compass mounting and the acoustic intensity array 15. For the purposes of this application, a compass is a device that provides an orientation signal based on the position of the acoustic intensity analyzer 10 within the Earth's magnetic field. A magnetometer is an exemplary compass.

In some embodiments, the orientation sensor 25 is an accelerometer that is mechanically fixed to the acoustic intensity analyzer 10 such that there is no relative movement between the accelerometer mounting and the acoustic intensity array 15. An accelerometer provides an orientation signal based on acceleration and gravity induced reaction forces. Thus the accelerometer provides an inertial reference platform that can determine changes in the position and orientation of the acoustic intensity analyzer 10 without using external references.

In some embodiments, the orientation sensor 25 is an inertial sensor that is mechanically supported by the acoustic intensity analyzer 10 such that there is no relative movement between the inertial sensor mounting and the acoustic intensity array 15. For the purposes of the invention, an inertial sensor includes any device that senses changes in the orientation of a support structure relative to a structure that resists changes in orientation. A gyroscope is an exemplary inertial sensor.

In some embodiments, the orientation sensor 25 includes any combination of a compass, an accelerometer, and an inertial sensor, as discussed above. In some embodiments, the orientation sensor 25 is a micro-electro-mechanical systems (MEMS) device.

The controller 30 includes, or is connected to an external device (e.g., a computer), which includes combinations of software and hardware that are operable to, among other things, determine vector quantities for acoustic source in range of the acoustic intensity analyzer 10. In one embodiment, the controller 30 or external device includes a printed circuit board ("PCB") that is populated with a plurality of electrical and electronic components that provide, power, operational control, and protection to the acoustic intensity analyzer 10. In some embodiments, the PCB includes, for example, a processing unit 40 (e.g., a microprocessor, a microcontroller, or another suitable programmable device), a memory 45, and a bus. The bus connects various components of the PCB including the memory 45 to the processing unit 40. The memory 45 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 40 is connected to the memory 45 and executes software that is capable of being stored in the RAM (e.g., during execution), the ROM (e.g., on a generally permanent basis), or another non-transitory computer readable medium such as another memory or a disc. Additionally or alternatively, the memory 45 is included in the processing unit 40. The controller 30 also includes an input/output (I/O) unit 50 that includes routines for transferring information between components within the controller 30 and other components of the acoustic intensity analyzer 10 or other acoustic intensity analyzers. For example, the communication module 35 is configured to provide communication between the acoustic intensity analyzer 10 and one or more devices in an acoustic intensity analysis system.

Software included in some embodiments of the acoustic intensity analyzer 10 is stored in the memory 45 of the controller 30. The software includes, for example, firmware, one or more applications, program data, one or more program modules, and other executable instructions. The controller 30 is configured to retrieve from the memory 45 and execute, among other things, instructions related to the described control processes and methods. For example, the controller 30 is configured to execute instructions retrieved from the memory 45 for correcting a positioning error in a quantity vector using an orientation signal from by the orientation sensor 25. In some embodiments, the controller 30 or external device includes additional, fewer, or different components.

The PCB also includes, among other components, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 30.

The communication module 35 sends and/or receives signals to and/or from one or more separate communication modules. Signals include, among other components, information, data, serial data, and data packets. The communication module 35 can be coupled to one or more separate communication modules via wires, optical fiber, and/or a wireless connections. Communication via wires and/or optical fiber can be accomplished using known network networks including, for example, an Ethernet network. Wireless connections can be accomplished using known technologies including, for example, Wi-Fi connections.

Figure 2:
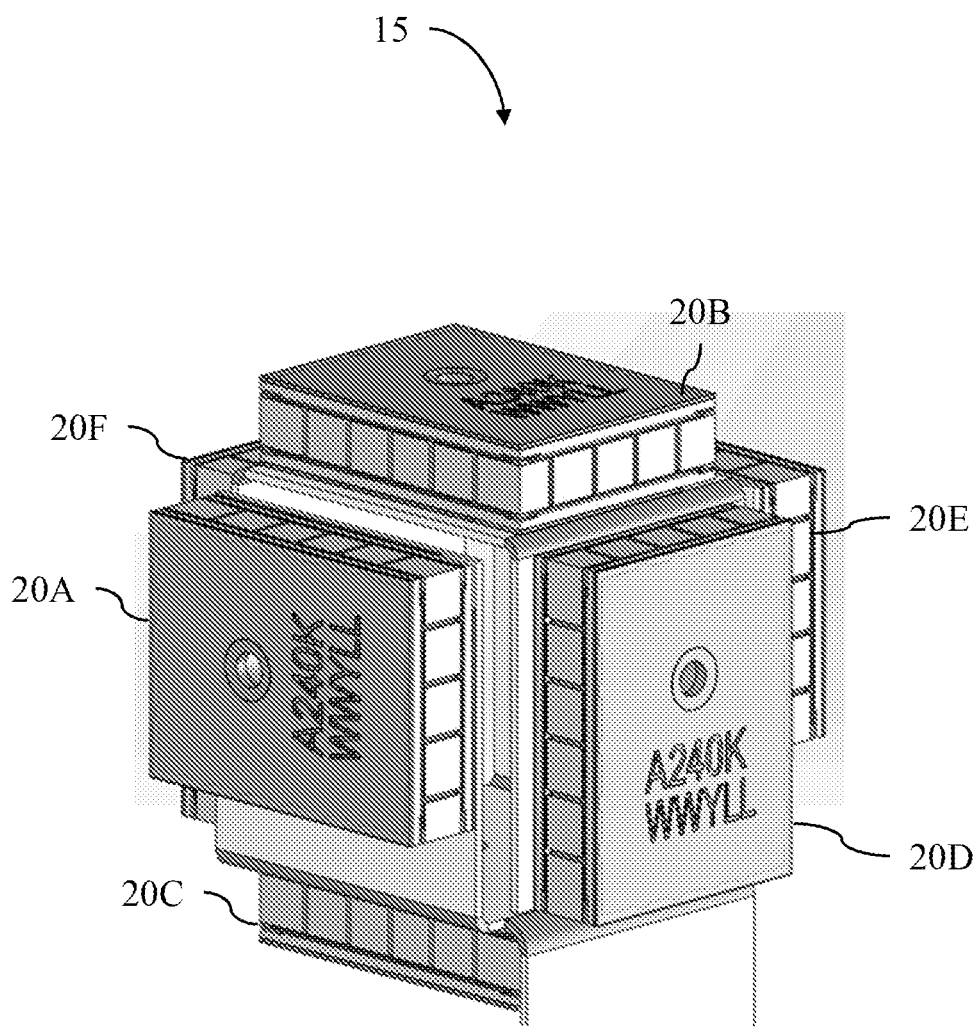
FIG. 2 is 3D diagram of an acoustic intensity array, according to some embodiments of the invention.

FIG. 2 illustrates a 3-dimensional representation of an acoustic intensity array 15, according to some embodiments of the invention. The acoustic intensity array 15, illustrated in FIG. 2, includes six microphones 20A-20F. Each of the six sides of the acoustic intensity array 15 includes a microphone.

Figure 3A:
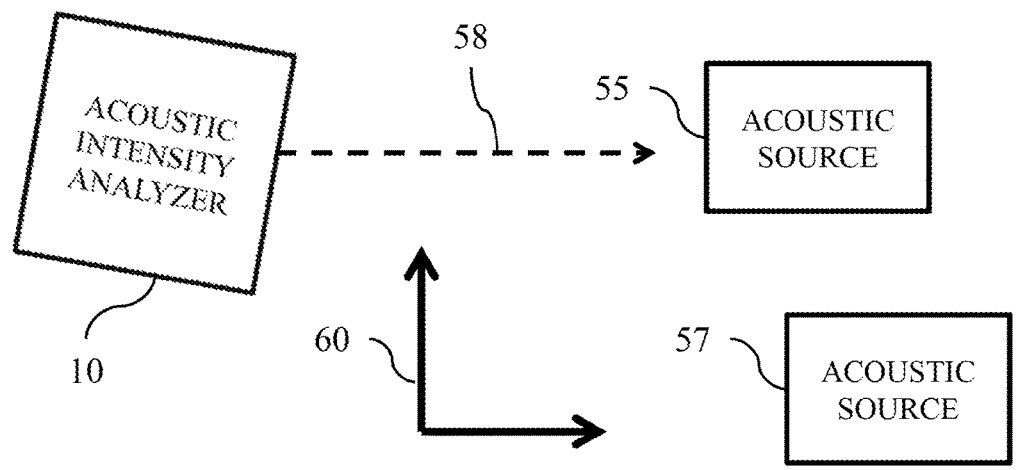
FIG. 3A is the acoustic intensity analyzer of FIG. 1 in a first position.

FIG. 3A illustrates an acoustic intensity analyzer 10 and two acoustic sources 55 and 57. The acoustic intensity analyzer 10 is positioned in a first orientation relative to a reference orientation 60. In some embodiments, the reference orientation 60 is a world reference orientation. The acoustic sources 55 and 57 produce acoustic fields. The controller 30 in the acoustic intensity analyzer 10 determines a vector quantity for each of the acoustic fields. Therefore, the controller 30 determines a vector quantity for each of the acoustic sources. However, the controller 30 aims the acoustic holography in a selected direction as indicated by a dashed line 58 directed toward acoustic source 55. The controller 30 uses the vector quantity for acoustic source 55 to produce an audio output that represents the acoustic field produced by acoustic source 55. The orientation sensor 25 determines the orientation of the acoustic intensity analyzer 10 relative to the reference orientation 60. The aim of the acoustic holography is determined relative to the reference orientation 60.

Figure 3B:
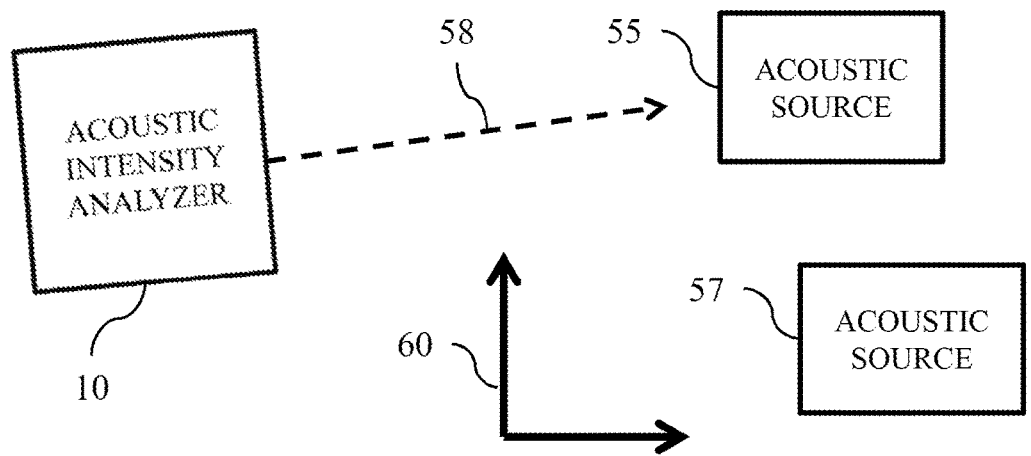
FIG. 3B is the acoustic intensity analyzer of FIG. 1 in a second position.

FIG. 3B illustrates the acoustic intensity analyzer 10 after the orientation changes. The acoustic intensity analyzer 10 is now positioned in a second orientation relative to a reference orientation 60. The change in position of the acoustic intensity analyzer 10 introduces a positioning error in the vector quantities determined by the controller 30 in the acoustic intensity analyzer 10. The orientation sensor 25 determines the new orientation of the acoustic intensity analyzer 10 relative to the reference orientation 60 in order to correct the positioning error in the vector quantities determined by the controller 30 in the acoustic intensity analyzer 10. The orientation sensor 25 provides an orientation signal to the controller 30 for adjusting the aim of the acoustic holography to maintain the selected direction of the acoustic holography despite the movement of the acoustic intensity analyzer 10.

In some embodiments, the acoustic intensity analyzer 10 includes more than one acoustic intensity array 15. In an acoustic intensity analyzer 10 that includes more than one acoustic intensity array 15, the controller 30 determines separate vector quantities for each acoustic intensity array 15. The controller 30 also combines the separate vector quantities to determine an overall vector quantity. As the relative positions between more than one acoustic intensity array 15 in an acoustic intensity analyzer 10 are constant, a single orientation sensor 25 is able to provide an orientation signal which the controller 30 uses to correct the vector quantities from each acoustic intensity array 15. In some embodiments, the acoustic intensity analyzer 10 includes more than one orientation sensor 25.

Figure 4:
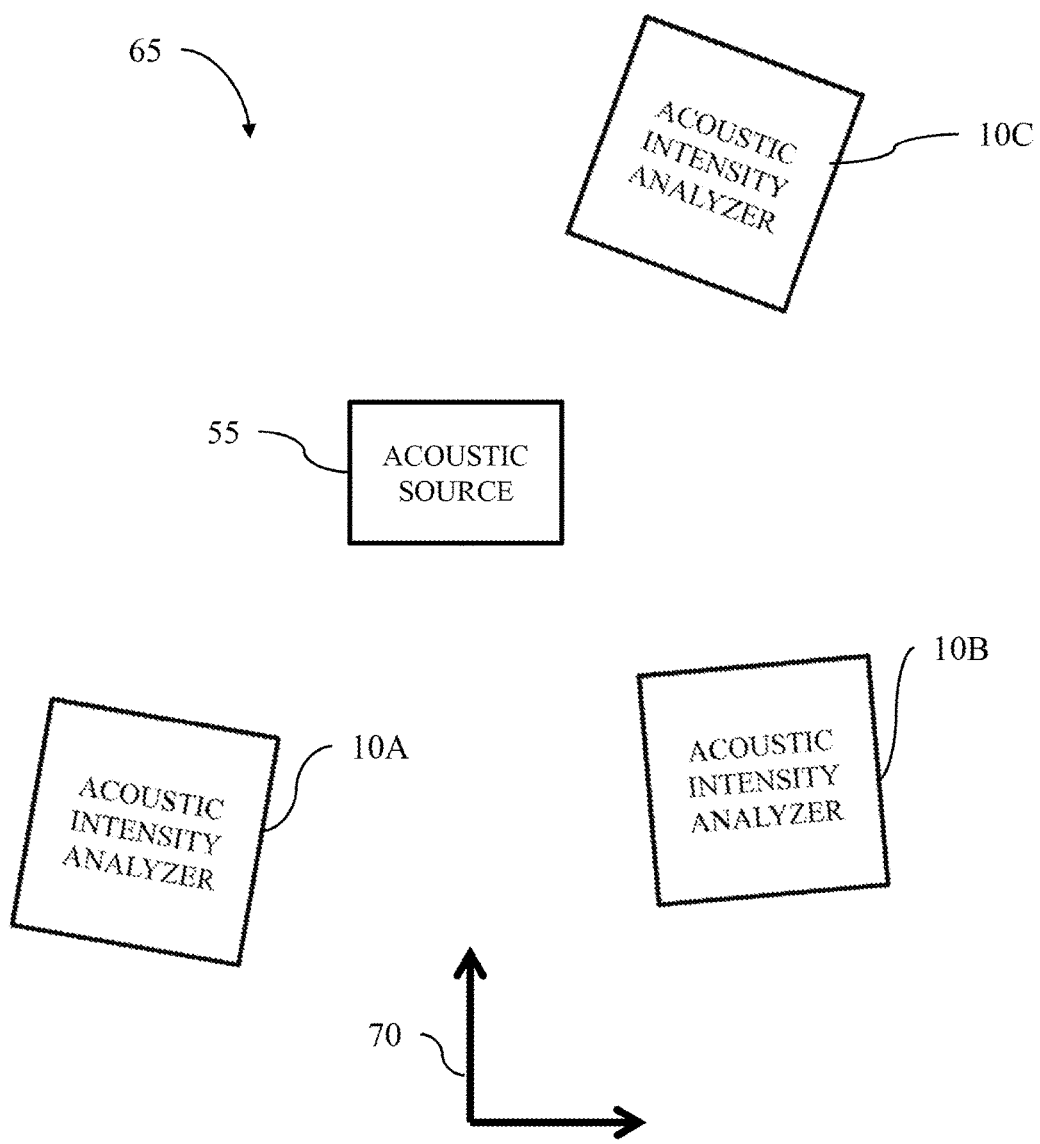
FIG. 4 is an acoustic intensity analysis system that includes a plurality of acoustic intensity analyzers.

In another embodiment, an acoustic intensity analysis system 65 includes, among other components, a plurality of acoustic intensity analyzers 10A-10C, as illustrated in FIG. 4. Each of the plurality of acoustic intensity analyzers 10A-10C includes at least one acoustic intensity array 15 and at least one orientation sensor 25. The orientation sensors 25 in each acoustic intensity analyzer 10A-10C determine the orientations of the acoustic intensity analyzers 10A-10C relative to a world reference orientation 70. The orientation sensors 25 correct the vector quantities measured by the acoustic intensity arrays 15 in each of the acoustic intensity analyzers 10A-10C to compensate for the individual motions of each acoustic intensity analyzer. The vector quantities from each acoustic intensity analyzer 10A-10C in the acoustic intensity analysis system 65 are combined to produce a final set of vector quantities for the acoustic source 55.

Figure 5:
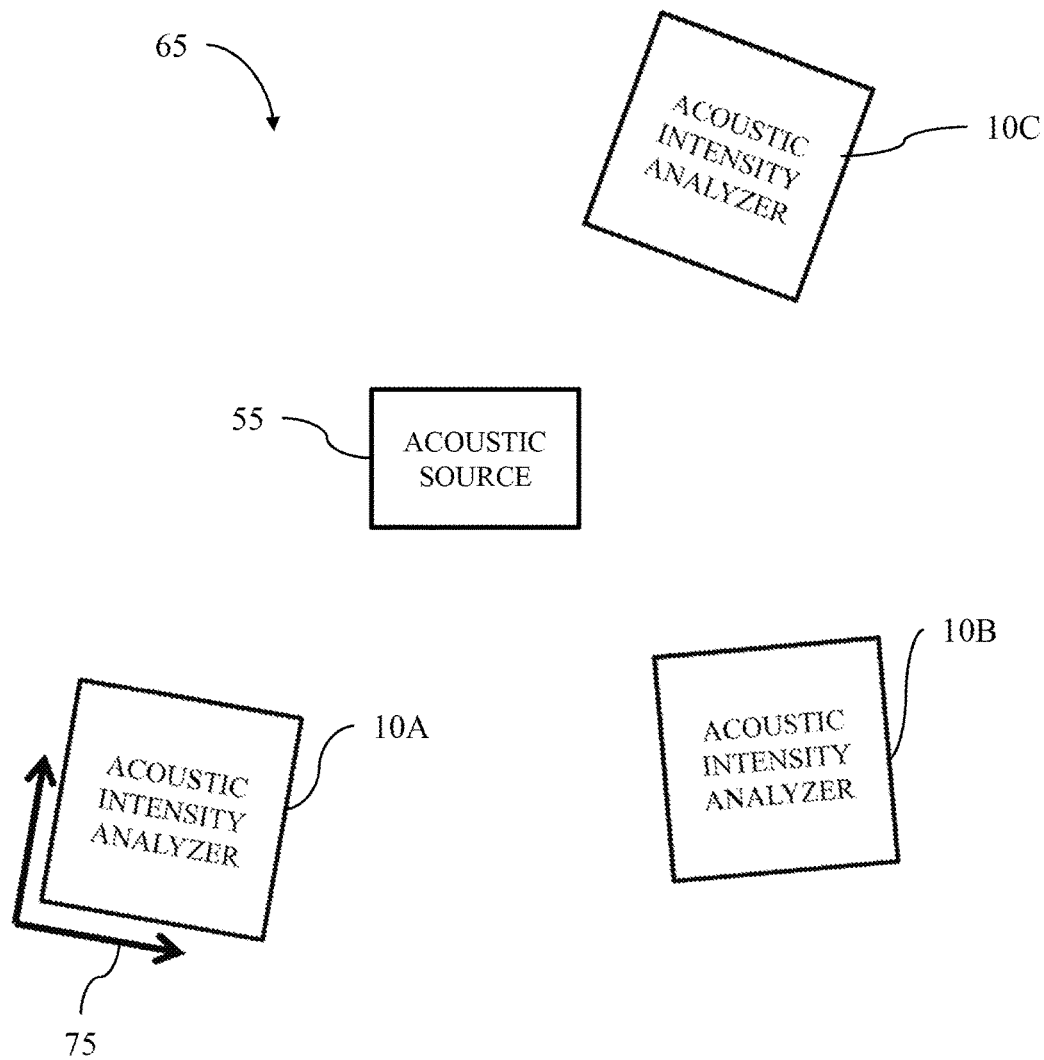
FIG. 5 is an acoustic intensity analysis system ha includes a plurality of acoustic intensity analyzers.

In some embodiments, one of the acoustic intensity analyzers 10A-10C in the acoustic intensity analysis system 65 is designated as a master acoustic intensity analyzer, as illustrated in FIG. 5. For example, acoustic intensity analyzer 10A in FIG. 5 is designated as the master acoustic intensity analyzer. The master acoustic intensity analyzer 10A receives information from the other acoustic intensity analyzers 10B and 10C in the acoustic intensity analysis system 65. In one embodiment, the information includes, among other components, vector quantities and orientation signals from the other acoustic intensity analyzers 10B and 10C. In another embodiment, the information includes, among other components, measurements of the acoustic intensity arrays 15 and orientation signals from the other acoustic intensity analyzers 10B and 10C.

In some embodiments, a master reference orientation 75 is used instead of a world reference orientation 70. The master reference orientation 75 is the orientation of the master acoustic intensity analyzer 10C. The other acoustic intensity analyzers 10B and 10C use their orientation sensors 25 to determine their orientations relative to the master reference orientation 75. In some embodiments, the master acoustic intensity analyzer changes from one acoustic intensity analyzer to another. For example, an exemplary acoustic intensity analysis system that includes a first acoustic intensity analyzer integrated into a wearable device, worn on a user's head, and a second acoustic intensity analyzer integrated into a cell phone. The first acoustic intensity analyzer is the master acoustic intensity analyzer, until the user initiates an activity on the phone, such as taking a video. While taking the video, the second acoustic intensity analyzer is the master acoustic intensity analyzer.

In an acoustic intensity analysis system that includes multiple acoustic intensity analyzer, the relative locations of each acoustic intensity analyzer must be known to use acoustic holography. These relative locations are typically unknown during start-up of the acoustic intensity analysis system. In some embodiments, the acoustic intensity analyzers determine their relative positions. In some embodiments, inertial methods or other location detecting devices including GPS may be used for determination of the locations of individual acoustic intensity analyzers. In some embodiments, each acoustic intensity analyzer includes an acoustic source. A method of call and repeat could be used to triangulate the relative positions of each of the acoustic intensity analyzers. All of the other acoustic intensity analyzers listen while one acoustic intensity analyzer provides an acoustic chirp. Each acoustic intensity analyzer gives a proposed vector quantity based on the acoustic chirp. In turn, each acoustic intensity analyzer chirps while the other acoustic intensity analyzers listen. With the given vector quantity information, the relative location of each acoustic intensity analyzer is determined.

In another embodiment, the acoustic intensity analyzers are electrically coupled to each other wirelessly (e.g., Wi-Fi). The same method of call and repeat can be performed with wireless signals to triangulate the relative positions of the acoustic intensity analyzers.

Other applications outside of acoustic recording/tracking are possible, such as ultrasonic.

Thus, the invention provides, among other things, systems and methods for producing audio output. Various features and advantages of the invention are set forth in the following claims.

What is claimed is:

1. An acoustic intensity analyzer to provide an audio output, the acoustic intensity analyzer comprising:
    an acoustic intensity array fixed to the acoustic intensity analyzer,
    a controller coupled to the acoustic intensity array to produce the audio output using acoustic holography based on an input from the acoustic intensity array, the controller is configured to set an aim of the acoustic holography in a selected direction; and
    an orientation sensor coupled to the controller and mechanically fixed to the acoustic intensity analyzer such that there is no relative movement between the orientation sensor and the acoustic intensity array, the orientation sensor detecting a change in an orientation of the acoustic intensity array and providing an orientation signal to the controller for adjusting the aim of the acoustic holography to maintain the selected direction.

2. The acoustic intensity analyzer of claim 1, wherein the orientation sensor is at least one selected from a group consisting of an accelerometer, a gyroscope, and a magnetometer.

3. The acoustic intensity analyzer of claim 1, wherein the controller is further configured to produce the audio output using the acoustic holography based on the input from the acoustic intensity array includes determining an intensity value based on the input and the orientation signal.

4. The acoustic intensity analyzer of claim 3, wherein the input includes a velocity of an acoustic signal and a pressure of the acoustic signal.

5. An acoustic intensity analyzer to provide an audio output, the acoustic intensity analyzer comprising:
    an acoustic intensity array fixed to the acoustic intensity analyzer,
    a controller coupled to the acoustic intensity array to produce the audio output using acoustic holography based on an input from the acoustic intensity array, the controller is configured to set an aim of the acoustic holography in a selected direction; and
    an orientation sensor coupled to the controller and mechanically fixed to the acoustic intensity analyzer such that there is no relative movement between the orientation sensor and the acoustic intensity array, the orientation sensor detecting a change in an orientation of the acoustic intensity array and providing an orientation signal to the controller for adjusting the aim of the acoustic holography to maintain the selected direction,
    wherein the controller is further configured to receive information from a second acoustic intensity analyzer, the second acoustic intensity analyzer including a second acoustic intensity array and a second orientation sensor, wherein a position of the acoustic intensity analyzer is different from a second position of the second acoustic intensity analyzer.

6. The acoustic intensity analyzer of claim 5, wherein the controller is further configured to produce the audio output using the acoustic holography based on the input from the acoustic intensity array and the information received for the second acoustic intensity analyzer.

7. The acoustic intensity analyzer of claim 5, wherein the controller is further configured to determine a difference in the orientation of the acoustic intensity array in the acoustic intensity analyzer and the second acoustic intensity array in the second acoustic intensity analyzer.

8. The acoustic intensity analyzer of claim 5, wherein the controller is further configured to determine the position of the second acoustic intensity analyzer.

9. The acoustic intensity analyzer of claim 8, wherein the controller is further configured to determine the selected direction based on the input and the information received from the second acoustic intensity analyzer.

10. The acoustic intensity analyzer of claim 5, wherein the information includes at least one selected from a group consisting of a second input from the second acoustic intensity array, a second orientation signal from the second orientation sensor, and an intensity value.

11. A method of providing an audio output using an acoustic intensity analyzer, the method comprising:
    capturing an input with an acoustic intensity array fixed to the acoustic intensity analyzer;
    producing the audio output using acoustic holography based on the input with a controller coupled to the acoustic intensity array,
    setting an aim of the acoustic holography in a selected direction with the controller;
    detecting a change in an orientation of the acoustic intensity analyzer with an orientation sensor mechanically fixed to the acoustic intensity analyzer such that there is no relative movement between the orientation sensor and the acoustic intensity array;
    determining an orientation signal with the orientation sensor, the orientation signal based on the change in the orientation of the acoustic intensity analyzer; and
    adjusting the aim of the acoustic holography to maintain the selected direction based on the orientation signal with the controller.

12. The method of claim 11, wherein the orientation sensor is at least one selected from a group consisting of an accelerometer, a gyroscope, and a magnetometer.

13. The method of claim 11, further comprising determining an intensity value based on the input and the orientation signal with the controller.

14. The method of claim 13, wherein the input includes a velocity of an acoustic signal and a pressure of the acoustic signal.

15. The method of claim 11, further comprising receiving information from a second acoustic intensity analyzer with the controller, the second acoustic intensity analyzer including a second acoustic intensity array and a second orientation sensor, wherein a position of the acoustic intensity analyzer is different from a second position of the second acoustic intensity analyzer.

16. The method of claim 15, further comprising producing, with the controller, the audio output using the acoustic holography based on the input from the acoustic intensity array and the information received for the second acoustic intensity analyzer.

17. The method of claim 15, further comprising determining, with the controller a difference in the orientation of the acoustic intensity array in the acoustic intensity analyzer and the second acoustic intensity array in the second acoustic intensity analyzer.

18. The method of claim 15, further comprising determining the position of the second acoustic intensity analyzer with the controller.

19. The method of claim 18, further comprising determining, with the controller, the selected direction based on the input and the information received from the second acoustic intensity analyzer.

20. The method of claim 15, wherein the information includes at least one selected from a group consisting of a second input from the second acoustic intensity array, a second orientation signal from the second orientation sensor, and an intensity value.

* * * * *